(12) United States Patent
Ye et al.

(10) Patent No.: US 12,549,586 B2
(45) Date of Patent: Feb. 10, 2026

(54) METHODS AND SYSTEM FOR UPDATING CYBER-SECURITY STATUS OF NETWORKED ASSETS

(71) Applicant: Nuvolo Technologies Corporation, Paramus, NJ (US)

(72) Inventors: Tao Ye, Garfield, NJ (US); Asim Rizvi, Howell, NJ (US); Trupti Vinay Rajhans, Pune (IN)

(73) Assignee: NUVOLO TECHNOLOGIES CORPORATION, Davidson, NC (US)

( * ) Notice: Subject to any disclaimer, the term of this patent is extended or adjusted under 35 U.S.C. 154(b) by 261 days.

(21) Appl. No.: 18/096,604

(22) Filed: Jan. 13, 2023

(65) Prior Publication Data

US 2023/0231866 A1 Jul. 20, 2023

Related U.S. Application Data

(60) Provisional application No. 63/299,645, filed on Jan. 14, 2022.

(51) Int. Cl.
| | | |
|---|---|---|
| *H04L 9/40* | (2022.01) | |
| *G06F 12/16* | (2006.01) | |
| *G06F 15/16* | (2006.01) | |
| *G06F 21/35* | (2013.01) | |
| *G06F 21/56* | (2013.01) | |
| *H04L 9/32* | (2006.01) | |
| *H04L 29/06* | (2006.01) | |

(52) U.S. Cl.
CPC .............................. *H04L 63/1433* (2013.01)

(58) Field of Classification Search
CPC ............. H04L 63/1433; H04L 63/1408; H04L 63/1441

USPC ........................................................... 726/25
See application file for complete search history.

(56) References Cited

U.S. PATENT DOCUMENTS

| | | | |
|---|---|---|---|
| 2008/0072330 A1* | 3/2008 | Kulack | .................... G06F 21/71 726/25 |
| 2015/0172311 A1* | 6/2015 | Freedman | ............... H04L 63/20 726/1 |
| 2015/0242297 A1* | 8/2015 | Johnson, Jr. | ........ G06F 11/3438 702/186 |
| 2016/0065603 A1* | 3/2016 | Dekel | ................. H04L 63/1425 726/23 |
| 2019/0158270 A1* | 5/2019 | Berti | ........................ G06F 21/30 |
| 2019/0205826 A1* | 7/2019 | Hanis | ................. G06Q 30/0185 |

(Continued)

FOREIGN PATENT DOCUMENTS

WO   WO-2006040560 A1 * 4/2006 ............. G07C 5/008

*Primary Examiner* — Emmanuel L Moise
*Assistant Examiner* — Berhanu Shitayewoldetadik
(74) *Attorney, Agent, or Firm* — Womble Bond Dickinson (US) LLP (57) ABSTRACT

Methods, systems, and devices for updating cyber security status of networked assets are disclosed. In some embodiments, first asset data indicating existence of a first cyber-security risk associated with an asset and a second asset data indicating execution of an action that is configured to respond to the first cyber-security risk may be received at a device configured with synchronizing the security status of the networked assets. The device may then convert the second asset data into the format of the first asset data and transmit the same to the monitoring system that provided the first asset data to the device for asset status synchronization.

20 Claims, 4 Drawing Sheets

(56) References Cited

U.S. PATENT DOCUMENTS

| | | | | |
|---|---|---|---|---|
| 2021/0006574 A1* | 1/2021 | Venter | G06N 5/025 |
| 2021/0133669 A1* | 5/2021 | Cella | G06Q 10/0637 |
| 2021/0133670 A1* | 5/2021 | Cella | G06N 3/0442 |
| 2022/0109689 A1* | 4/2022 | Hamdi | H04L 63/0263 |
| 2022/0335431 A1* | 10/2022 | Brazao | G06F 21/602 |
| 2023/0078033 A1* | 3/2023 | Yadav | H04L 63/1433 |
| | | | 726/25 |
| 2023/0239318 A1* | 7/2023 | Fellows | H04L 63/1425 |
| | | | 726/23 |
| 2024/0388574 A1* | 11/2024 | Crabtree | H04L 9/0891 |
| 2024/0419847 A1* | 12/2024 | Shinozaki | G06Q 50/04 |

* cited by examiner

METHODS AND SYSTEM FOR UPDATING CYBER-SECURITY STATUS OF NETWORKED ASSETS

RELATED APPLICATION

This application claims priority under 35 U.S.C. § 119(e) to U.S. Provisional Patent Application No. 63/299,645 filed on Jan. 14, 2022, the entire content of which is hereby expressly incorporated by reference herein.

TECHNICAL FIELD

This disclosure relates to methods and systems for updating cyber security status of networked assets, and more specifically to methods and system for synchronizing the status of an asset between a monitoring system and a cyber-security service provider.

BACKGROUND

Networked environments, such as ecosystems of Internet-of-Things (IoT) assets, can be targets of cyber security attacks, which range from a new unauthorized IoT device plugging in into the networked environment to unauthorized modifications to system configuration to anomalous transmissions of sensitive and/or large amount of data to systems that are external to the network environment. Monitoring systems can be used to monitor the networked environment and its assets to identify signatures of such attacks so that appropriate measures can be taken to address the attacks, and consequences thereof.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

Some embodiments of the present disclosure disclose a method comprising receiving, using at least one processor, a first asset data in a first format from a monitoring system configured to monitor a networked system including a first asset, the first asset data indicating existence of a first cyber security risk associated with the first asset. Further, the method comprises receiving, using the at least one processor, a second asset data indicating execution of an action that is configured to respond to the first cyber security risk. Further, the method comprises transforming, using the at least one processor, the second asset data into the first format of the first asset data. Further, the method comprises generating, using the at least one processor, a first action script using the transformed second asset data, the first action script configured to cause the monitoring system to update a status of the first asset using the transformed second asset data. In addition, the method comprises transmitting, using the at least one processor, the first action script to the monitoring system.

Some embodiments of the present disclosure disclose a system, comprising: at least one computer-readable medium storing computer-executable instructions; and at least one processor configured to execute the computer executable instructions to cause the system to perform operations comprising receiving, using at least one processor, a first asset data in a first format from a monitoring system configured to monitor a networked system including a first asset, the first asset data indicating existence of a first cyber security risk associated with the first asset. Further, the operations comprise receiving, using the at least one processor, a second asset data indicating execution of an action that is configured to respond to the first cyber security risk. Further, the operations comprise transforming, using the at least one processor, the second asset data into the first format of the first asset data. Further, the operations comprise generating, using the at least one processor, a first action script using the transformed second asset data, the first action script configured to cause the monitoring system to update a status of the first asset using the transformed second asset data. In addition, the operations comprise transmitting, using the at least one processor, the first action script to the monitoring system.

Some embodiments of the present disclosure disclose a non-transitory computer readable medium (CRM) comprising at least one program for execution by at least one processor of a system, the at least one program including instructions which, when executed by the at least one processor, cause the system to perform operations comprising receiving, using at least one processor, a first asset data in a first format from a monitoring system configured to monitor a networked system including a first asset, the first asset data indicating existence of a first cyber security risk associated with the first asset. Further, the operations comprise receiving, using the at least one processor, a second asset data indicating execution of an action that is configured to respond to the first cyber security risk. Further, the operations comprise transforming, using the at least one processor, the second asset data into the first format of the first asset data. Further, the operations comprise generating, using the at least one processor, a first action script using the transformed second asset data, the first action script configured to cause the monitoring system to update a status of the first asset using the transformed second asset data. In addition, the operations comprise transmitting, using the at least one processor, the first action script to the monitoring system.

BRIEF DESCRIPTION OF THE DRAWINGS

Like reference numbers and designations in the various drawings indicate like elements.

DETAILED DESCRIPTION

A network monitoring system identifies an event that can compromise the security of an asset (e.g., the cyber-security of a device in a networked system) and reports the discovery to a network security management server that in turn generates an action script (e.g., work order) to have the security risk addressed by a cyber-security service provider. Examples of such events include the discovery of a new device in the networked system, an unexpected cyber-activity related to the asset (e.g., changes to asset configurations, anomalous data transmissions, etc.), and/or the like. Once the action script is executed, and the work order closes or a responsive action is performed according to the action script to address the security risk (e.g., the asset is updated)), the network security management server executes a process to have the status of the updated asset synchronized with the network monitoring system, i.e., to have the network monitoring system update the status of the asset.

The disclosed techniques allow efficient synchronization of the status of assets between the monitoring system that is configured to monitor the network of assets (e.g., for cyber-security attacks, etc.) for security risks and a security services provider such as a cyber-security service provider that is configured to address the security risks discovered by the monitoring system, altering the state of the assets in the process. This is in particular the case when the network includes a large number of assets and/or the security service provider responds to a large number of security risks to the assets, resulting in a large number of changes or updates to the states of the assets. As such, the techniques allow the status of networked assets to be updated in a scalable and efficient manner.

Figure 1:
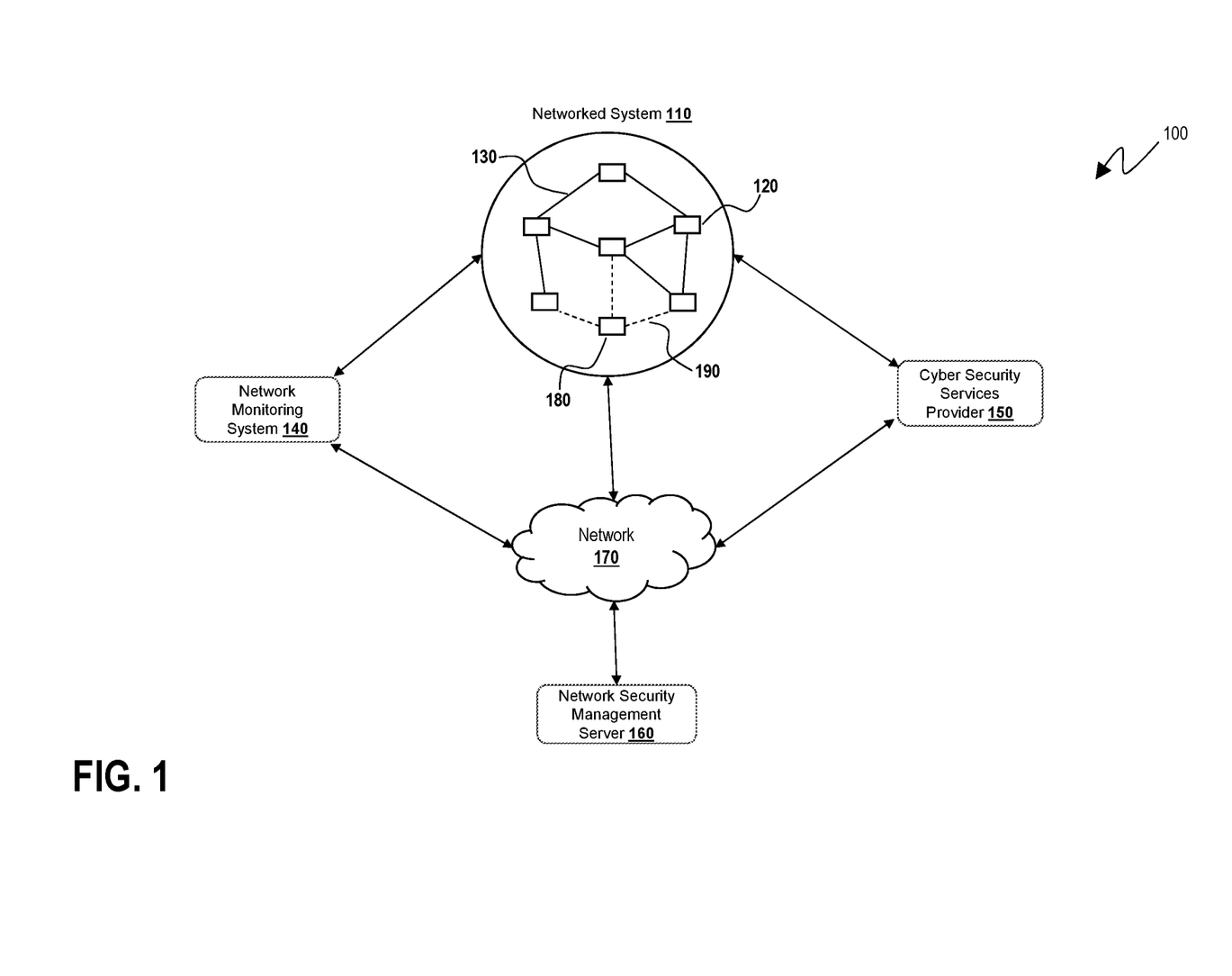
FIG. 1 illustrates example computing system for updating cyber security status of networked assets, according to some embodiments of the present disclosure.

FIG. 1 illustrates example computing system 100 for updating cyber security status of a networked system of assets, according to some embodiments of the present disclosure. In some embodiments, the computing system 100 includes a networked system of assets 110 that includes multiple assets 120 some of which are connected communicatively with each other via communication links 130, a network monitoring system 140, a cyber security service provider 150, and a network security management server 160 communicatively connected to each other via a network 170. Each of the networked system of assets 110 comprising the multiple assets 120, the network monitoring system 140, the cyber security service provider 150, and the network security management server 160 includes or can be a computing device, where the computing device operates one or more operating system (e.g., Microsoft Windows, Apple OSX, Linux, Unix, Android, Apple iOS, etc.) and/or architectures (e.g., x86, PowerPC, ARM, etc.). The computing device can also be or include computers (such as desktop computers, notebook computers, server systems, etc.), mobile computing devices (such as cellular phones, smartphones, tablets, personal data assistants, notebook computers with networking capability), and other computing devices capable of transmitting and receiving data via the network 170.

In some embodiments, the network 170 can be any communications network through which data can be transferred and shared. For example, the network 170 can be a local area network (LAN) or a wide-area network (WAN), such as the Internet. The network 170 can be implemented using various networking interfaces, for instance wireless networking interfaces (such as Wi-Fi, Bluetooth, or infrared) or wired networking interfaces (such as Ethernet or serial connection). The network 170 also can include combinations of more than one network, and can be implemented using one or more networking interfaces.

In some embodiments, the networked system 110 is composed of or comprises multiple assets 120 where some or all of these are communicatively connected to each other via a communication link 130. The communication link 130 can be a wired or wireless communication link. The assets 120 can be network infrastructure devices such as but not limited to routers, firewalls, switches, servers, load-balancers, intrusion detection systems, domain name systems, storage area networks, and/or the like. The assets can also be Internet-of-Things (IoT) devices such as but not limited to smart and connected consumer devices (e.g., wearable devices, etc.), industrial devices (e.g., sensors, etc.), enterprise devices (e.g., facility control devices (e.g., lighting control, locks), etc.), and/or the like.

In some embodiments, the network monitoring system 140 can be configured to monitor the networked system 110 and the assets 120 that constitute the networked system 110 for indications of one or more cyber-security risks that can compromise the assets 120 and the performance of the entire networked system 110. For example, the network monitoring system 140 can monitor an asset 120 for anomalous behavior, such as but not limited to anomalous data transmission rate (e.g., data transmission rate far in excess of the average rate of transmission), unexpected changes to the configurations or settings of the asset 120, the unexpected deactivation of a communication link 130, etc., which can be indications that the asset 120 is experiencing or under the threat of a cyber security risk (e.g., data breach). As another example, the network monitoring system 140 can monitor the networked system 110 for the presence of an unknown asset 180 in the networked system 110. For instance, the network monitoring system 140 can detect new connection 190 being established between a new asset 180 and assets 120 that already exist in or constitute the networked system 110, and identify the new asset 180 as a source of potential cyber security risk to the networked system 110.

Upon detecting cyber-security risks associated with the networked system 110 and/or the assets 120 thereof, in some embodiments, the network monitoring system 140 generates a first asset data having a first format indicating the presence of the cyber-security risks to the networked system 110 and/or the assets 120. The first data can include some or all the information related to the cyber-security risks, such as timestamps identifying dates, times, etc., of the occurrence and/or detection of the cyber-risks, an identifier of the cyber-security risk, identifiers and status (e.g., active, expired, authorized, unauthorized, etc.) of the networked system 110 and the assets 120 associated with the cyber-security risk, the detected events (e.g., presence of new unidentified asset 180, the asset 120 with the anomalous behavior, etc.) indicating the cyber-security risks, and/or the like. In some instances, the first format of the first asset data can be the arrangement of the afore-mentioned information in the first asset data generated by the network monitoring system 140, i.e., the data structures in the first asset data that contain the information. Examples of the data structure include tables, lists, arrays, trees, etc.

In some embodiments, the network monitoring system 140 transmits, via the network 170, the generated asset data to the network security management server 160 to initiate a process that can result in the execution of an action that is configured to respond to the cyber-security risk identified by the network monitoring system 140. For example, upon receiving the first asset, the network security management server 160 may generate and transmit to the cyber security services provider 150 an action script (e.g., work order) that is configured to cause the cyber security services provider 150 execute an action that can respond to the cyber-security risk faced by the networked system 110 and the assets 120. In some cases, the action script itself may include or suggest the action, and in some cases, the action script may be determined by the cyber security services provider 150.

In some instances, the cyber-security risk can be the afore-mentioned anomalous behavior (e.g., anomalous data transmission rate by an asset 120, unexpected changes to configurations of the asset 120, etc.), and in such cases, the action that is configured to respond to the cyber-security risk can be the quarantining of the asset that is associated with the cyber security risk. For example, the cyber security services provider 150 can quarantine the asset with the anomalous data transmission rate until the nature of the cyber security risk is investigated and the asset 120 determined to be safe. The cyber security services provider 150 can also update the asset 120 to neutralize the cyber-security risk. For instance, the cyber security services provider 150 can update the settings or configurations of the asset 120 to respond to the unexpected changes to the configurations of the asset 120.

In some instances, the cyber-security risk can be the presence of an unknown asset 180 in the networked system 110. For example, the cyber-security risk can be the establishment of a new communication link 190 connecting the unknown asset 180 to an existing asset 120 of the networked system 110. In such cases, the cyber security services provider 150 may investigate the cyber-security risk and execute an action that is configured to respond to the cyber-security risk. For instance, the investigation may conclude that the asset 180 is authorized (e.g., and the cyber-security risk is a false alarm), and in such cases, the cyber security services provider 150 may recognize or register the asset 180 as a legitimate asset 120 of the networked system 110 (e.g., in a database listing the constituent assets 120 of the networked system 110). If the cyber security services provider 150 determines that the cyber-security risk is real, the cyber security services provider 150 can quarantine the asset 180.

After executing the action to respond to the cyber-security risk, in some embodiments, the cyber security services provider 150 generates second asset data indicating the execution of the action that is configured to respond to the cyber-security risk. For example, the second asset data may include the updates (e.g., updated configurations or settings) applied to the assets 120 or the networked system 110 when the action is executed to respond to the cyber-security risk. As another example, the second asset data can include information related to the updated status of the assets 120 or the networked system 110 after the execution of the action. For instance, the second asset data can include fields with indications that the asset 180 has been quarantined when determined to be unauthorized, or recognized or registered when confirmed to be an authorized asset of the networked system 110.

Upon receiving the second asset data, in some embodiments, the network security management server 160 converts the second asset data to the format of the first asset data that the network security management server 160 received from the network monitoring system 140. For example, the network security management server 160 may map the second asset data to the fields of the first asset data so that the second asset data are arranged in the format of the first asset data. For instance, the updated configurations or settings in the second asset data can be in the form of a list, and the format of the first asset data can be such that configurations or settings of assets 120 are arranged in the data in tabular format. In such cases, the network security management server 160 maps the second asset data, and the updated configurations or settings therein, to the tabular format of the first asset data such that the second asset data is converted to the format of the first asset data that the network monitoring system 140 can recognize and understand.

In some embodiments, the network security management server 160 generates and transmits to the network monitoring system 140 an action script (e.g., work order) that is configured to cause the network monitoring system 140 synchronize the status of the networked system 110 and/or the assets 120 with the updated status contained in the converted first asset data. For instance, the network security management server 160 can generate and transmit to the network monitoring system 140, via the network 170, an action script including the converted second asset data, allowing the network monitoring system 140 to monitor the networked system 110 and/or the assets 120 while being aware of the latest status of the networked system 110 and/or the assets 120. For example, if the converted second asset data indicates that new asset 180 or an increased data transmission rate of an asset 120 is authorized, then the network monitoring system 140 would not flag the presence of the new asset 180 or the increased data transmission as cyber security risks to the networked system 110. In some instances, the network monitoring system 140 may store the updated status of the networked system 110 and/or the assets 120 in a local database or a database that is operatively coupled to the network monitoring system 140.

Figure 2:
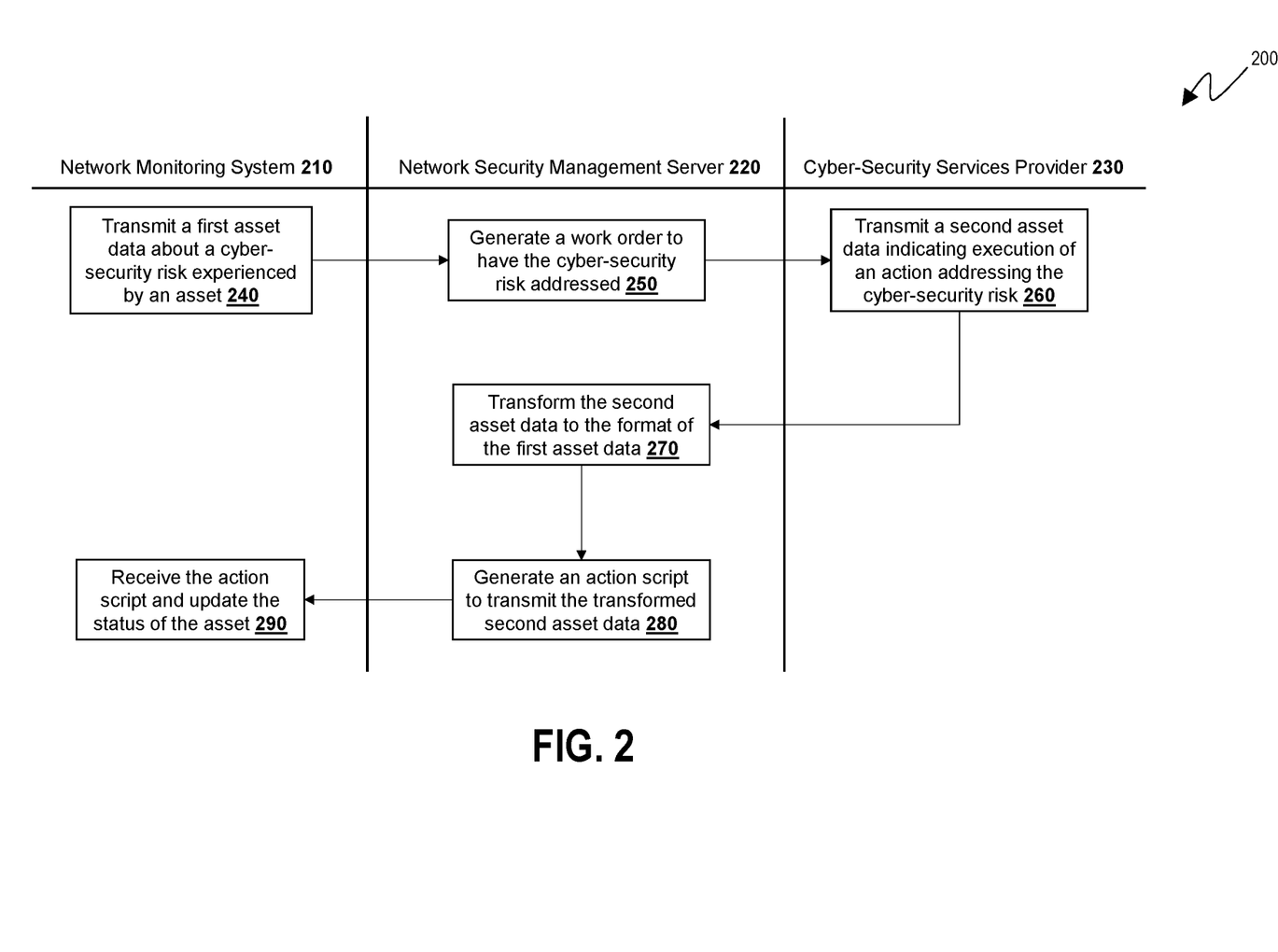
FIG. 2 illustrates an example flow diagram for updating cyber security status of networked assets, according to some embodiments of the present disclosure.

FIG. 2 illustrates an example flow diagram 200 for updating cyber security status of networked assets, according to some embodiments of the present disclosure. At 240, the network monitoring system 210 transmits to the network security management server 220 a first asset data having a first format about a cyber security risk associated with an asset of a networked system of assets. For example, the cyber security risk can be the presence of an unknown or unexpected asset in the network of assets, or anomalous behavior exhibited by any of the assets of the network of assets.

In such cases, at 250, the network security management server 220 can generate and transmit to the cyber security services provider 230 a first action script such as but not limited to a work order that is configured to cause the cyber security services provider 230 address the cyber security risk faced by the asset. The work order can prescribe actions that the cyber security services provider 230 can undertake to respond to the cyber security risk or provide the first asset data to the cyber security services provider 230 for the latter to determine the appropriate action to respond to or neutralize the cyber security risk. In some instances, the network security management server 220 may receive multiple first asset data from the network monitoring system 210, and in such cases, the network security management server 220 may determine whether to process the multiple first asset data serially or in parallel (e.g., determine whether to generate first action scripts for each first asset data serially or in parallel).

In response to receiving the work order from the network security management server 220, at 260, the cyber security services provider 230 executes the appropriate action to respond to the cyber security risk, such action having been prescribed in the work order by the network security management server 220 or determined by the cyber security services provider 230. Responsive actions can include but are not limited to quarantining an asset to which the cyber security risk is associated when the cyber security risk is confirmed, updating the status of the asset and/or the network of assets to register or recognize otherwise the asset as authorized when the asset is determined to be so, updating the configurations/settings of the asset to which the cyber security risk is associated so as to neutralize or combat the cyber security risk, etc. The cyber security services provider 230 then generates and transmits back to the network security management server 220 a second asset data having a second format that indicates the execution of the responsive action. For example, the second asset data can include information (e.g., in the second format) related to the updated configurations/settings, the updated status of the asset and/or the network of assets, etc.

Upon receiving the second asset data, at 270, the network security management server 220 transforms the second asset data from its second format to the first format of the first asset data so that the network monitoring system 210 can read or access the converted second asset data when receiving it from the network security management server 220. In some instances, the network security management server 220 may receive multiple second asset data from the cyber security services provider 230, and in such cases, the network security management server 220 may determine whether to process the multiple second asset data serially or in parallel (e.g., determine whether to transform the multiple second asset data to the first format serially or in parallel).

At 280, the network security management server 220 generates an action script (e.g., a work order) that is configured to provide the network monitoring system 210, in the second format that the network monitoring system 210 can read or understand, the information related to the updated configurations/settings, updated status of the asset and/or the network of assets, etc. For example, the network security management server 220 generates and transmits to the network monitoring system 210 an action script including the transformed or converted second asset data. At 290, the network monitoring system 210 receives the action script and updates the status of the asset and/or the network of assets based on the converted second asset data in the received action script.

Figure 3:
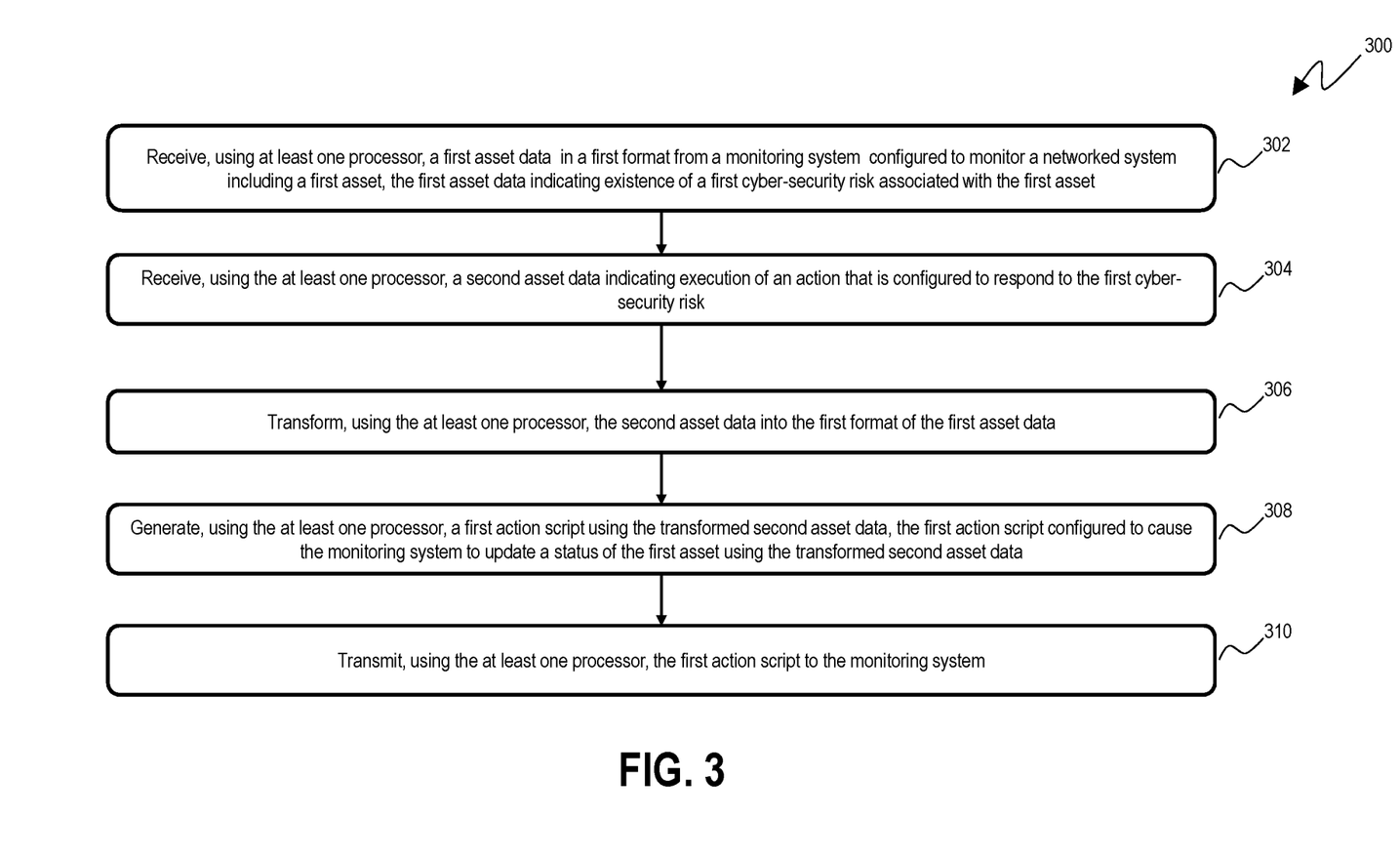
FIG. 3 is an example process for updating cyber security status of networked assets, according to some embodiments of the present disclosure.

Referring now to FIG. 3, illustrated is a flowchart of a process 300 for updating cyber security status of networked assets, according to some embodiments of the present disclosure. In some embodiments, one or more of the steps described with respect to process 300 are performed (e.g., completely, partially, and/or the like) by the network monitoring system 140, 210, the network security management server 160, 220, and/or the cyber security services provider 150, 230.

At block 302, in some embodiments, at least one processor receives a first asset data in a first format from a monitoring system configured to monitor a networked system including a first asset, the first asset data indicating existence of a first cyber-security risk associated with the first asset.

At block 304, in some embodiments, the at least one processor receives a second asset data indicating execution of an action that is configured to respond to the first cyber-security risk.

At block 306, in some embodiments, the at least one processor transforms the second asset data into the first format of the first asset data.

At block 308, in some embodiments, the at least one processor generates a first action script using the transformed second asset data, the first action script configured to cause the monitoring system to update a status of the first asset using the transformed second asset data.

At block 310, in some embodiments, the at least one processor transmits the first action script to the monitoring system.

In some embodiments, process 300 further comprises generating, using the at least one processor, a second action script in response to the receiving the first asset data, the second action script indicating the action to be executed to respond to the first cyber-security risk associated with the first asset.

Further, in some embodiments, process 300 comprises receiving, using the at least one processor, a third asset data in a second format from the monitoring system, the third asset data indicating existence of a second cyber-security risk associated with a second asset; receiving, using the at least one processor, a fourth asset data indicating execution of a second action that is configured to respond to the second cyber-security risk; and determining, using the at least one processor, whether to perform serially or in parallel the transforming the second asset data and transforming the third asset data into the third format of the third asset data.

In some embodiments, the first cyber-security risk includes a new device establishing a connection with the first asset; and the second asset data indicates quarantining of, or registration of, the new device, the quarantining or the registration occurring after the new device is determined to be unauthorized or authorized, respectively. Further, in some embodiments, the first action script causes the monitoring system to update the status of the new device as a new asset of the networked system when the transformed second asset data indicates the registration of the new device.

In some embodiments, the first cyber-security risk includes an increased data transmission by the first asset; and the second asset data indicates quarantining of the first asset, the quarantining occurring after the first asset is determined to be compromised.

In some embodiments, the first asset is an Internet-of-Things (IOT) sensor, a medical alert system, or a third-party integration device.

Figure 4:
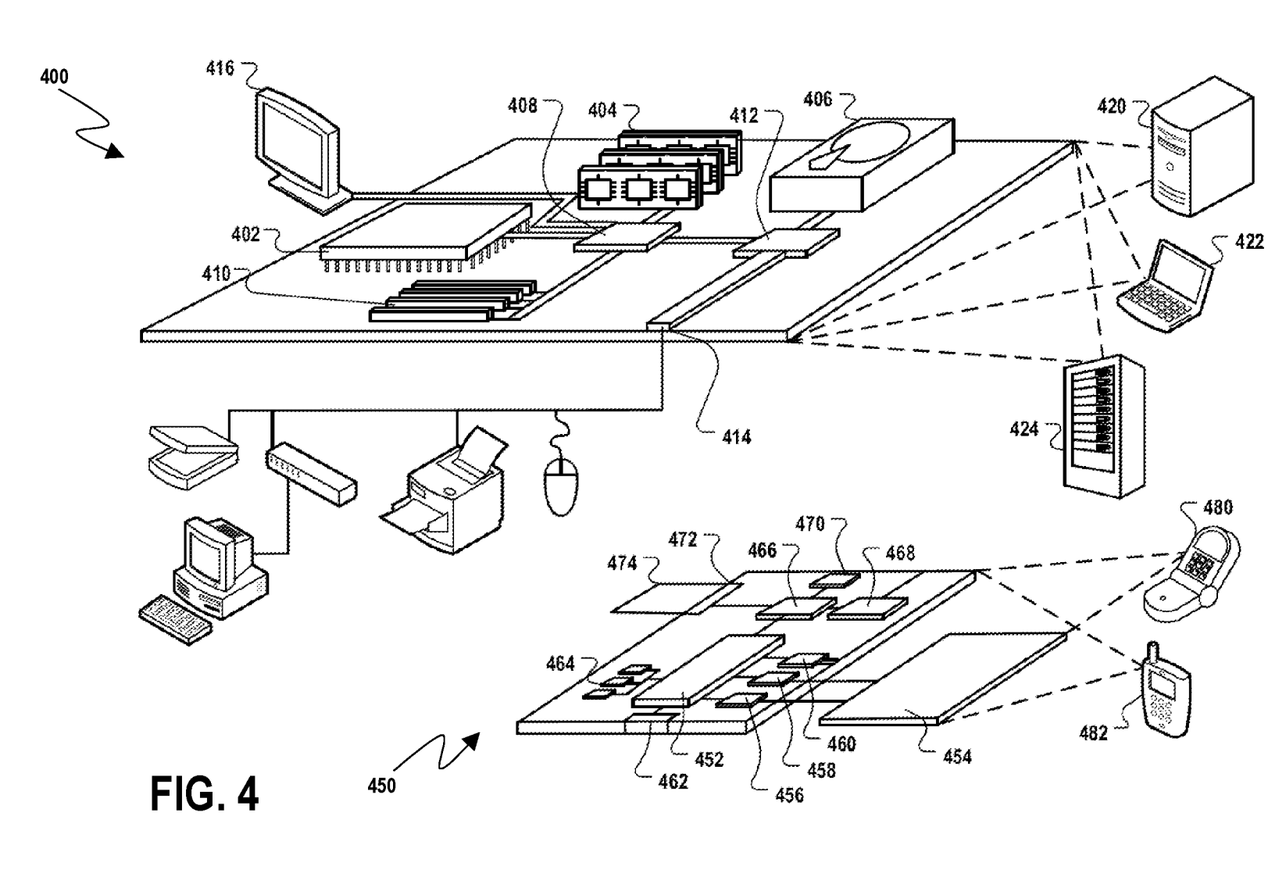
FIG. 4 is a diagram of an example computer system, according to some embodiments of the present disclosure.

FIG. 4 is a block diagram of computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a non-transitory computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a non-transitory computer-readable medium. In various different implementations, the storage device 406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a non-transitory computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of duties is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device, such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a thin-film-transistor liquid-crystal display (TFT LCD) display or an organic light-emitting diode (OLED) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of device 450 with other devices. External interface 462 may provide, for example, for wired communication (e.g., via a docking procedure) or for wireless communication (e.g., via Bluetooth or other such technologies).

The memory 464 stores information within the computing device 450. In one implementation, the memory 464 is a non-transitory computer-readable medium. In one implementation, the memory 464 is a volatile memory unit or units. In another implementation, the memory 464 is a non-volatile memory unit or units. Expansion memory 474 may also be provided and connected to device 450 through expansion interface 472, which may include, for example, a SIMM card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provided as a security module for device 450, and may be programmed with instructions that permit secure use of device 450. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS receiver module 470 may provide additional wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any non-transitory signal used to provide machine instructions and/or data to a programmable processor.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the invention have been described. Other embodiments are within the scope of the following claims. For example, the steps recited in the claims, described in the specification, or depicted in the figures can be performed in a different order and still achieve desirable results. In some cases, multitasking and parallel processing may be advantageous.

What is claimed is:

1. A method comprising:
    receiving, using at least one processor, a first asset data in a first format from a monitoring system configured to monitor a networked system including a first asset, the first asset data indicating existence of a first cyber-security risk associated with the first asset;
    receiving, using the at least one processor, a second asset data indicating execution of an action that is configured to respond to the first cyber-security risk;
    transforming, using the at least one processor, the second asset data into the first format of the first asset data;
    generating, using the at least one processor, a first action script using the transformed second asset data, the first action script configured to cause the monitoring system to update a status of the first asset using the transformed second asset data, wherein the update of the status includes a change to a configuration of the first asset;
    transmitting, using the at least one processor, the first action script to the monitoring system;
    receiving, using the at least one processor, a third asset data in a second format from the monitoring system, the third asset data indicating existence of a second cyber-security risk associated with a second asset;
    receiving, using the at least one processor, a fourth asset data indicating execution of a second action that is configured to respond to the second cyber-security risk; and
    determining, using the at least one processor, whether to perform serially or in parallel the transforming the second asset data and transforming the third asset data into a third format of the third asset data.

2. The method of claim 1, further comprising:
    generating, using the at least one processor, a second action script in response to the receiving the first asset data, the second action script indicating the action to be executed to respond to the first cyber-security risk associated with the first asset.

3. The method of claim 1, wherein:
    the first cyber-security risk includes a new device establishing a connection with the first asset; and
    the second asset data indicates quarantining of, or registration of, the new device, the quarantining or the registration occurring after the new device is determined to be unauthorized or authorized, respectively.

4. The method of claim 3, wherein the first action script causes the monitoring system to update the status of the new device as a new asset of the networked system when the transformed second asset data indicates the registration of the new device.

5. The method of claim 1, wherein:
    the first cyber-security risk includes an increased data transmission by the first asset; and
    the second asset data indicates quarantining of the first asset, the quarantining occurring after the first asset is determined to be compromised.

6. The method of claim 1, wherein the first asset is an Internet-of-Things sensor, a medical alert system, or a third-party integration device.

7. The method of claim 1, wherein the first format is a table.

8. The method of claim 1, wherein the second format is a list.

9. A system comprising:
at least one computer-readable medium storing computer-executable instructions; and
at least one processor configured to execute the computer executable instructions to cause the system to perform operations comprising:
receiving, using at least one processor, a first asset data in a first format from a monitoring system configured to monitor a networked system including a first asset, the first asset data indicating existence of a first cyber-security risk associated with the first asset;
receiving, using the at least one processor, a second asset data indicating execution of an action that is configured to respond to the first cyber-security risk;
transforming, using the at least one processor, the second asset data into the first format of the first asset data;
generating, using the at least one processor, a first action script using the transformed second asset data, the first action script configured to cause the monitoring system to update a status of the first asset using the transformed second asset data;
transmitting, using the at least one processor, the first action script to the monitoring system;
receiving, using the at least one processor, a third asset data in a second format from the monitoring system, the third asset data indicating existence of a second cyber-security risk associated with a second asset;
receiving, using the at least one processor, a fourth asset data indicating execution of a second action that is configured to respond to the second cyber-security risk; and
determining, using the at least one processor, whether to perform serially or in parallel the transforming the second asset data and transforming the third asset data into the third format of the third asset data.

10. The system of claim 9, wherein the operations further comprise:
generating, using the at least one processor, a second action script in response to the receiving the first asset data, the second action script indicating the action to be executed to respond to the first cyber-security risk associated with the first asset.

11. The system of claim 9, wherein:
the first cyber-security risk includes a new device establishing a connection with the first asset; and
the second asset data indicates quarantining of, or registration of, the new device, the quarantining or the registration occurring after the new device is determined to be unauthorized or authorized, respectively.

12. The system of claim 11, wherein the first action script causes the monitoring system to update the status of the new device as a new asset of the networked system when the transformed second asset data indicates the registration of the new device.

13. The system of claim 9, wherein:
the first cyber-security risk includes an increased data transmission by the first asset; and the second asset data indicates quarantining of the first asset, the quarantining occurring after the first asset is determined to be compromised.

14. The system of claim 9, wherein the first asset is an Internet-of-Things sensor, a medical alert system, or a third-party integration device.

15. A non-transitory computer readable medium comprising at least one program for execution by at least one processor of a system, the at least one program including instructions which, when executed by the at least one processor, cause the system to perform operations comprising:
receiving, using at least one processor, a first asset data in a first format from a monitoring system configured to monitor a networked system including a first asset, the first asset data indicating existence of a first cyber-security risk associated with the first asset;
receiving, using the at least one processor, a second asset data indicating execution of an action that is configured to respond to the first cyber-security risk;
transforming, using the at least one processor, the second asset data into the first format of the first asset data;
generating, using the at least one processor, a first action script using the transformed second asset data, the first action script configured to cause the monitoring system to update a status of the first asset using the transformed second asset data, wherein the update to the status includes a change to a configuration of the first asset;
transmitting, using the at least one processor, the first action script to the monitoring system;
receiving, using the at least one processor, a third asset data in a second format from the monitoring system, the third asset data indicating existence of a second cyber-security risk associated with a second asset;
receiving, using the at least one processor, a fourth asset data indicating execution of a second action that is configured to respond to the second cyber-security risk; and
determining, using the at least one processor, whether to perform serially or in parallel the transforming the second asset data and transforming the third asset data into a third format of the third asset data.

16. The non-transitory computer readable medium of claim 15, wherein the operations further comprise:
generating, using the at least one processor, a second action script in response to the receiving the first asset data, the second action script indicating the action to be executed to respond to the first cyber-security risk associated with the first asset.

17. The non-transitory computer readable medium of claim 15, wherein:
the first cyber-security risk includes a new device establishing a connection with the first asset; and
the second asset data indicates quarantining of, or registration of, the new device, the quarantining or the registration occurring after the new device is determined to be unauthorized or authorized, respectively.

18. The non-transitory computer readable medium of claim 17, wherein the first action script causes the monitoring system to update the status of the new device as a new asset of the networked system when the transformed second asset data indicates the registration of the new device.

19. The non-transitory computer readable medium of claim 15, wherein:
the first cyber-security risk includes an increased data transmission by the first asset; and the second asset data indicates quarantining of the first asset, the quarantining occurring after the first asset is determined to be compromised.

20. The non-transitory computer readable medium of claim 15, wherein the first asset is an Internet-of-Things sensor, a medical alert system, or a third-party integration device.

\* \* \* \* \*